Patented July 19, 1949

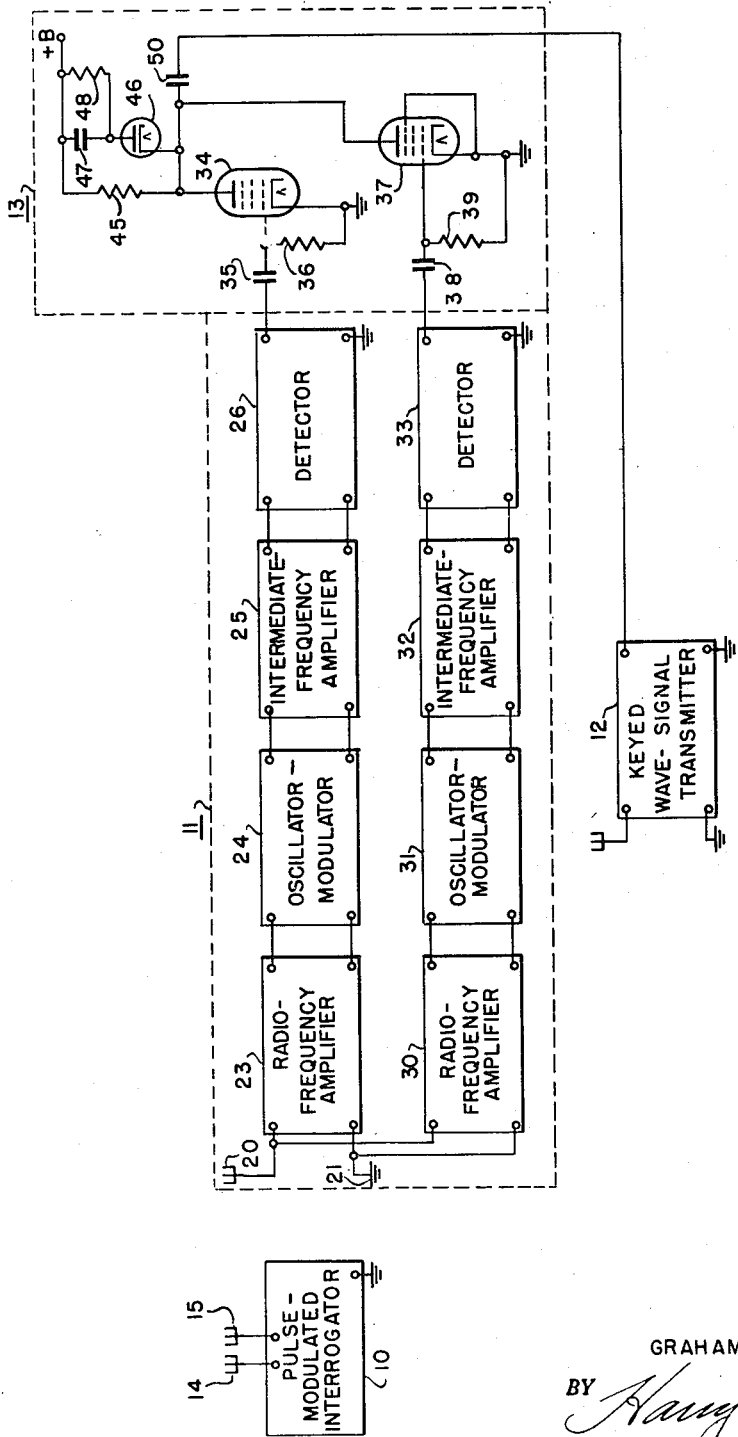

2,476,639

UNITED STATES PATENT OFFICE

2,476,639

CONTROL ARRANGEMENT FOR WAVE-SIGNAL RECEIVERS

Graham Isaac Thomas, Hollinwood, England, assignor to Hazeltine Research, Inc., Chicago, Ill., a corporation of Illinois Application January 17, 1947, Serial No. 722,610
In Great Britain June 26, 1944

Section 1, Public Law 690, August 8, 1946
Patent expires June 26, 1964

3 Claims. (Cl. 250—8)

The present invention is directed to control arrangements for wave-signal receivers. Although the invention is subject to a variety of applications, it is especially suited for inclusion in a wave-signal transpondor system and will be particularly described in that connection. The term "wave-signal transpondor system" is intended to mean a wave-signal translating system which includes a receiving unit and a transmitting unit so arranged that a predetermined answer or reply is transmitted in response to a received interrogating signal, the reply and interrogating signals preferably comprising pulse-modulated radiant-energy wave signals.

Transpondors are frequently used in navigating and direction-finding systems for airplanes because they permit the personnel of a craft to obtain navigating information which is easily identified with fixed locations. That is, the signal transmitted by any transpondor may include pulse components of a selected duration or may exhibit any other preselected characteristic for positively identifying the transpondor from which a reply has been received. Inasmuch as bearing and/or range information may also be deduced from the reply signal, a chart showing the distribution of transpondors in any location enables accurate navigating data to be readily derived.

Certain prior transpondors utilize a simple interconnection between the receiving and transmitting units so that the receipt of a single pulse of an interrogating signal trips the transmitter to send out one pulse of the reply. Such arrangements are perfectly satisfactory for many applications, but they afford substantially no secrecy feature and such a feature may oftentimes be desirable. Systems of the described type may be actuated by an unauthorized listener who sends out a pulse-modulated challenging signal the carrier frequency of which sweeps through a band including the selected operating frequency of the transpondor.

Other transpondors known to the art are provided with coded receivers. The coding may be accomplished by incorporating parallel channels in the receiver, terminated in a mixer which controls the transmitter portion. Usually, one channel exhibits a fixed but greater time delay for signal translation than the other so that coincident output pulses from the channels, required to have the mixer trip the transmitter, occur only when the interrogating signal includes a pair of pulse components having a time separation equal to the difference in transmission delays of the channels. Arrangements of this type provide a certain degree of secrecy but may also respond to an unauthorized challenge that contains a pulse having a duration approximately equal to the over-all interval of the paired pulses intended to exercise control over the transpondor.

It is an object of this invention, therefore, to provide a control arrangement for a wave-signal receiver which avoids one or more of the aforementioned limitations of prior arrangements.

It is another object of the invention to provide a new and improved control arrangement which is especially suited as a control link extending between the receiving and transmitting units of a transpondor system.

It is a specific object of the invention to provide a new and improved control arrangement for a wave-signal receiver which produces a desired control effect only in response to a plurality of pulse-modulated signals having different carrier frequencies transmitted to the receiver to produce a corresponding plurality of coincident pulses.

In accordance with the invention, a control arrangement for a wave-signal receiver comprises a first channel, selective to a first frequency, including a vacuum-tube pulse repeater for translating a pulse-modulated carrier-wave signal of the aforesaid first frequency transmitted over a given propagation path to the receiver. The arrangement also includes a second channel, selective to a second frequency, including a vacuum-tube pulse repeater for translating a pulse-modulated carrier-wave signal of the aforesaid second frequency transmitted over the same path to the receiver. Finally, the arrangement has an impedance network common to the output circuits of both of the repeaters for applying an excitation potential to the output circuits. This network is responsive to coincident output signals from the output circuits of the repeaters for deriving an output pulse from the receiver. This impedance network comprises a first branch including an impedance and a parallel connected second branch including a diode serially connected with the combination of a condenser and a parallel-connected impedance.

For a better understanding of the present invention, together with other and further objects thereof, reference is had to the following description taken in connection with the accompanying drawing, and its scope will be pointed out in the appended claims.

The single figure of the drawing is a schematic representation of a navigating system comprising a wave-signal receiver which includes a control arrangement embodying the invention.

Referring now more particularly to the drawing, the navigating system there represented comprises a pulse-modulated interrogator 10 and a wave-signal transpondor system having a receiving unit 11 and a transmitting unit 12 interconnected by way of a control arrangement 13 constructed in accordance with the invention. The interrogator 10 may be considered to be mounted upon an airplane to enable the personnel thereof to derive direction-finding information from the transpondor system. The interrogator may be of any conventional design and construction and, therefore, has been represented in block diagram. It has a pair of radiating antennas 14 and 15 which may be directional or omnidirectional, as desired. This unit essentially comprises an arrangement for transmitting a pair of pulse-modulated carrier-wave signals having different, nonharmonically related carrier frequencies. It will be assumed throughout the remainder of the description of the illustrated embodiment that the pulses of the two different carrier-wave signals are transmitted simultaneously, each from one of the radiating antennas 14 and 15.

The receiving portion 11 of the transpondor system has a common antenna-ground system 20, 21 designed to accommodate both of the pulse-modulated signals transmitted from interrogator 10. The receiver portion has two channels, the first of which is provided by the cascaded arrangement of a radio-frequency amplifier 23 of any desired number of stages, an oscillator-modulator 24, an intermediate-frequency amplifier 25 of one or more stages, and a detector 26. The input terminals of this channel are directly connected with the antenna 20, 21. The second channel, which is of similar construction, has a radio-frequency amplifier 30 of any desired number of stages, the input circuit of which is also connected to the antenna 20, 21. Connected in cascade with amplifier 30 are an oscillator-modulator 31, an intermediate-frequency amplifier 32 of one or more stages, and a detector 33. The first channel 23—26 is tuned to be selective to a first frequency corresponding with the carrier frequency of one pulse-modulated signal transmitted from interrogator 10 over a propagation path to the transpondor. The alternate channel 30—33 is tuned to be selective to a second frequency which corresponds with the carrier frequency of the second pulse-modulated signal transmitted from the interrogator over the same propagation path to the transpondor.

The transmitting portion 12 of the transpondor system, which may be of any well-known construction, comprises a power transmitter normally maintained in a quiescent or inoperative condition. It has a keying or control circuit for controlling the transmitter to transmit a burst or pulse of high-frequency energy in response to each output pulse applied to the keying circuit from the control arrangement 13.

The control arrangement 13 is similar to a thermionic switching device for translating an output pulse from the receiving portion 11 to the transmitting portion 12 when prescribed operating conditions have been satisfied. This arrangement includes a first vacuum-tube pulse amplifier or repeater provided by a pentode tube 34. The input electrodes of tube 34 are coupled through a condenser 35 and a grid resistor 36 to the output terminals of detector 26 of the first-described frequency-selective channel. The arrangement also has a second pulse amplifier or repeater including a tube 37 having input electrodes coupled to the output circuit of detector 33 of the second-described frequency-selective channel by way of a condenser 38 and a resistor 39.

The control arrangement 13 additionally comprises means common to the output circuits of repeaters 34 and 37 and responsive to coincident output pulses from the first and second frequency-selective channels for deriving an output pulse from the receiver for application to the keying or control circuit of transmitting portion 12. This means, for the illustrated embodiment, is in the form of an impedance network through which excitation potentials, from a source indicated +B, are applied to the anode electrodes of tubes 34 and 37. The impedance network has a first branch including a resistor 45 and a parallel-connected second branch. The second branch has a diode 46 serially connected with the combination of a condenser 47 and a shunt- or parallel-connected resistor 48. The diode 46 is arranged with its cathode connected to the anode electrodes of both tubes 34, 37. Resistor 48 is selected to have a small value relative to that of resistor 45 constituting the first-described branch of the network. The time constant of condenser 47 and resistor 48 is selected to be long compared with the duration of the pulses transmitted from interrogator 10 to the transpondor system. The parameters of the described network are also selected so that the diode 46 is operated on that portion of its voltage-current characteristic where the direct-current resistance of the diode is small. A condenser 50, coupled to the cathode of diode 46, connects control arrangement 13 with the keying circuit of transmitter 12.

In considering the operation of the described navigating system, it will be assumed initially that no interrogating signals are being transmitted from interrogator 10 to transpondor 11—12—13. For the assumed quiescent operating condition, each repeater 34, 37 is conductive and the anode currents in each are substantially equal. Since resistor 48 is smaller in value than resistor 45 and since the D.-C. resistance of diode 46 is very small compared with either, resistor 48 carries more than half of the steady anode-cathode current drawn by repeaters 34 and 37 jointly. For this reason, the diode current is greater than the anode-cathode current of either repeater. Furthermore, the alternating-current connection through condenser 50 to transmitter 12 maintains the latter in its normally inoperative condition during the quiescent or steady-state conditions of repeaters 34 and 37.

Now, let it be assumed that the plane carrying the interrogator 10 desires direction-finding information and simultaneously transmits a pair of pulse-modulated signals over the same propagation path to the transpondor, the carrier frequencies of these signals being equal to the selective frequencies of the channels 23—26 and 30—33, respectively. The pulse component of the first carrier signal is translated by components 23—26, inclusive, in conventional superheterodyne fashion and applies this pulse with negative polarity to the input circuit of repeater 34. The pulse component of the second signal is simultaneously transmitted in the same fashion by components 30—33, supplying a pulse of negative polarity to the input circuit of repeater 37. The translated pulses simultaneously bias tubes 34 and 37 to cutoff, reducing their anode-cathode currents to zero. Diode 46 ceases to conduct and the potential established at the anodes of tubes 34 and 37 rises, supplying an output signal of positive polarity through condenser 50 to the keying circuit of transmitter 12. The transmitter is excited and transmits one pulse component of the reply signal. The duration of that component may be determined by the operating characteristics of the transmitter.

The reply pulse is received at the interrogator and its duration may serve to identify the transpondor and provide the necessary navigating information to personnel on the plane. Where the interrogator repeatedly transmits simultaneous pulses of the two selected carrier frequencies to which the channels of receiving portion 11 are tuned, the described operation is repeated. The transmitter sends out one pulse of the reply signal for each operating interval in which coincident output pulses are obtained from the channels of receiving portion 11 and applied to control arrangement 13, thereby to develop a control pulse for application to the keying circuit of the transmitter.

In the event that a pulse is translated by only a single channel of receiving portion 11, the repeater 34 or 37 connected with that channel is biased to cutoff. For such operating intervals, the current flow in the impedance network 45—48 is decreased by an amount equal to the normal value of the anode-cathode current of the repeater which has been cut off. Since the anode of the diode 46 is maintained at a substantially steady potential level by condenser 47, only a small change of potential is established at the cathode of the diode. This small potential change is insufficient to trip transmitter 12 into operation.

By appropriately selecting the ratio of resistor 45 to the sum of resistors 45 and 48, the control arrangement 13 may be caused to trigger transmitter 12 in response to any desired decrease of current flow through the impedance network. This means that the transmitter may be operated when the conductivity of devices 34, 37 is simultaneously reduced although not completely interrupted, where such operation is desired.

It is apparent from the foregoing description that control arrangement 13 is effective to initiate an operating cycle of transmitter 12 only when the following operating conditions are satisfied: (1) when pulse signals having frequencies corresponding to the selective frequencies of channels 23—26 and 30—33 are intercepted by antenna 20, 21; and (2) when the translation of pulses through these channels provides coincident input signals to repeaters 34, 37. This arrangement has a higher degree of secrecy than those of the prior art discussed above since both of the aforementioned operating conditions must be satisfied to initiate an output pulse from the transmitter.

The system illustrated in the drawing has been described as one in which the translation time from radio-frequency amplifier 23 to repeater 34 at the output of the first channel is equal to the translation time from amplifier 30 to repeater 37 at the output of the second channel. Of course, added secrecy may be realized by introducing an additional delay in one of the channels. Where this is done, the transmitter 12 is operated only when paired pulses are received by antenna 20, 21, these pulses having frequencies for selective translation by the channels of the receiver and occurring in a fixed time sequence with a time separation approximately equal to the additional translation delay introduced into one of the channels.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In a wave-signal receiver, a control arrangement comprising: a first channel, selective to a first frequency, including a vacuum-tube pulse repeater for translating a pulse-modulated carrier-wave signal of said first frequency transmitted over a given propagation path to the receiver; a second channel, selective to a second frequency, including a vacuum-tube pulse repeater for translating a pulse-modulated carrier-wave signal of said second frequency also transmitted over said path to the receiver; and an impedance network common to the output circuits of said repeaters for applying an excitation potential thereto and responsive to coincident output signals therefrom for deriving an output pulse from the receiver, said impedance network comprising a first branch including a resistor and a parallel-connected second branch including a diode serially connected with the combination of a condenser and a parallel-connected resistor.

2. In a wave-signal receiver, a control arrangement comprising: a first channel, selective to a first frequency, including a vacuum-tube pulse repeater for translating a pulse-modulated carrier-wave signal of said first frequency transmitted over a given propagation path to the receiver; a second channel, selective to a second frequency, including a vacuum-tube pulse repeater for translating a pulse-modulated carrier-wave signal of said second frequency also transmitted over said path to the receiver; and an impedance network common to the output circuits of said repeaters for applying an excitation potential thereto and responsive to coincident output signals therefrom for deriving an output pulse from the receiver, said impedance network comprising a first branch including a resistor and a parallel-connected second branch including a diode serially connected with the combination of a condenser and a parallel-connected resistor having a small value relative to the first-mentioned resistor.

3. In a wave-signal receiver, a control arrangement comprising: a first channel, selective to a first frequency, including a vacuum-tube pulse repeater for translating a pulse-modulated carrier-wave signal of said first frequency transmitted over a given propagation path to the receiver; a second channel, selective to a second frequency, including a vacuum-tube pulse repeater for translating a pulse-modulated carrier-wave signal of said second frequency also transmitted over said path to the receiver; and an impedance network common to the output circuits of said repeaters for applying an excitation potential thereto and responsive to coincident output signals therefrom for deriving an output pulse from the receiver, said impedance network comprising a first branch including an impedance and a parallel-connected second branch including a diode serially connected with the combination of a condenser and a parallel-connected impedance.

GRAHAM ISAAC THOMAS.

REFERENCES CITED

The following references are of record in the file of this patent:

UNITED STATES PATENTS

| Number | Name | Date |
|---|---|---|
| 1,740,833 | Ranger | Dec. 24, 1929 |
| 1,998,792 | Sedlmayer | Apr. 23, 1935 |
| 2,067,432 | Beverage | Jan. 12, 1937 |
| 2,104,635 | Breedlove | Jan. 4, 1938 |
| 2,403,622 | Tuska | July 9, 1946 |